United States Patent
Burwinkel et al.

(10) Patent No.: US 12,499,536 B2
(45) Date of Patent: Dec. 16, 2025

(54) MACHINE-LEARNING-BASED DETERMINING OF REFRACTIVE POWER FOR MEASURES FOR CORRECTING EYESIGHT FROM OCT IMAGES

(71) Applicant: Carl Zeiss Meditec AG, Jena (DE)

(72) Inventors: Hendrik Burwinkel, Munich (DE); Holger Matz, Unterschneidheim (DE); Stefan Saur, Aalen (DE); Christoph Hauger, Aalen (DE)

(73) Assignee: Carl Zeiss Meditec AG, Jena (DE)

( * ) Notice: Subject to any disclaimer, the term of this patent is extended or adjusted under 35 U.S.C. 154(b) by 518 days.

(21) Appl. No.: 17/759,360

(22) PCT Filed: Jan. 21, 2021

(86) PCT No.: PCT/EP2021/051301
§ 371 (c)(1),
(2) Date: Jul. 22, 2022

(87) PCT Pub. No.: WO2021/148519
PCT Pub. Date: Jul. 29, 2021

(65) Prior Publication Data
US 2023/0084284 A1    Mar. 16, 2023

(30) Foreign Application Priority Data
Jan. 24, 2020 (DE) .......................... 102020101764.2

(51) Int. Cl.
*G06T 7/00* (2017.01)
*A61B 3/10* (2006.01)
(Continued)

(52) U.S. Cl.
CPC ............ *G06T 7/0012* (2013.01); *A61B 3/102* (2013.01); *A61B 3/1225* (2013.01); *G06N 3/044* (2023.01);
(Continued)

(58) Field of Classification Search
CPC ......... G06T 7/0012; G06T 2207/10016; G06T 2207/10101; G06T 2207/20072;
(Continued)

(56) References Cited

U.S. PATENT DOCUMENTS

2018/0296320 A1* 10/2018 Gupta .................. A61B 3/0025
2019/0099262 A1    4/2019 Ladas
(Continued)

FOREIGN PATENT DOCUMENTS

| EP | 1961374 A1 | 8/2008 |
|---|---|---|
| EP | 3491996 A1 | 6/2019 |
| WO | 2015091796 A2 | 6/2015 |

OTHER PUBLICATIONS

Apr. 30, 2021 Written Opinion (WO) of the International Searching Authority (ISA) and International Search Report (ISR) issued in International Application No. PCT/EP2021/051301 (with English Translation).
(Continued)

*Primary Examiner* — Van D Huynh
(74) *Attorney, Agent, or Firm* — Honigman LLP; Brett A. Krueger

(57) ABSTRACT

The invention relates to a computer-implemented method and a corresponding system for a machine-learning-supported determining of refractive power for a measure for correcting the eyesight of a patient. The method involves providing a scan result of an eye, wherein the scan result represents an image of an anatomical structure of the eye. The method also involves supplying the scan result as input data to a first machine-learning system in the form of a convolutional neural network, and using output values of the first machine-learning system as input data for a second machine-learning system in the form of a multi-layer perceptron, and a target refraction value for the second machine-learning system is used as an additional input value
(Continued)

for the second machine-learning system. Finally, the method involves determining parameters for the measure for correcting the eyesight of a patient via an immediate and direct cooperation of the first machine-learning system and the second machine-learning system.

10 Claims, 6 Drawing Sheets

(51) Int. Cl.
    *A61B 3/12*     (2006.01)
    *G06N 3/044*     (2023.01)
    *G06N 3/045*     (2023.01)
    *G06N 3/08*     (2023.01)

(52) U.S. Cl.
    CPC ............... *G06N 3/045* (2023.01); *G06N 3/08* (2013.01); *G06T 2207/10016* (2013.01); *G06T 2207/10101* (2013.01); *G06T 2207/20072* (2013.01); *G06T 2207/20081* (2013.01); *G06T 2207/20084* (2013.01); *G06T 2207/30041* (2013.01)

(58) Field of Classification Search
    CPC . G06T 2207/20081; G06T 2207/20084; G06T 2207/30041; A61B 3/102; A61B 3/1225; G06N 3/044; G06N 3/045; G06N 3/08; G16H 20/40

See application file for complete search history.

(56) References Cited

U.S. PATENT DOCUMENTS

| | | | |
|---|---|---|---|
| 2019/0110753 A1* | 4/2019 | Zhang | A61B 3/0025 |
| 2019/0258930 A1* | 8/2019 | Ohlendorf | G16H 50/20 |
| 2020/0015894 A1 | 1/2020 | Bor et al. | |
| 2020/0285711 A1* | 9/2020 | Zimanyi | G06N 3/10 |
| 2021/0150679 A1* | 5/2021 | Roulet | G06N 3/047 |
| 2021/0224594 A1* | 7/2021 | Odaibo | A61B 3/14 |
| 2021/0369195 A1* | 12/2021 | Russakoff | G16H 30/40 |
| 2022/0400942 A1* | 12/2022 | Leung | A61B 3/0025 |
| 2022/0400943 A1* | 12/2022 | Lee | A61B 3/12 |
| 2023/0404398 A1* | 12/2023 | Tran | G16H 30/40 |
| 2024/0338824 A1* | 10/2024 | Vaghefi Rezaei | G06T 7/33 |

OTHER PUBLICATIONS

Dec. 10, 2020 Office Action issued in corresponding German Application No. 10 2020 101 764.2 (in German language).
Graph neural networks: Variations and applications, Alexander Gaunt, University of Cambridge, Mar. 15, 2018, URL: https://www.microsoft.com/en-us/research/video/graph-neural-networks-variations-applications/, [recherchiert/abgerufen am Dec. 9, 2020].

* cited by examiner

100

| 102 | Providing a scan result of an eye |

| 104 | Supplying the scan results as input data to a 1$^{st}$ machine learning system |

| 106 | Using output values of the first machine learning system as input data for a second machine learning system |

| 108 | Determining parameters for the measure for correcting the visual perception of a patient by immediate and direct interaction of the 1$^{st}$ machine learning system and the 2$^{nd}$ machine learning system |

FIG. 1

MACHINE-LEARNING-BASED DETERMINING OF REFRACTIVE POWER FOR MEASURES FOR CORRECTING EYESIGHT FROM OCT IMAGES

CROSS-REFERENCE TO RELATED APPLICATIONS

This application is the U.S. national stage of PCT/EP2021/051301 filed on Jan. 21, 2021, which claims priority of German Patent Application DE 10 2020 101 764.2 filed on Jan. 24, 2020. The disclosures of these prior applications are considered part of the disclosure of this application and are hereby incorporated by reference in their entireties.

TECHNICAL FIELD

The disclosure relates to determining refractive power for an intraocular lens and, in particular, to a computer-implemented method for a machine learning-supported determination of refractive power for a measure for correcting the visual perception of a patient, to a corresponding system, and to a corresponding computer program product for carrying out the method.

BACKGROUND

Replacing the biological lens of an eye with an artificial intraocular lens (IOL)—for example, in the case of an (age-related) refractive error or in the case of cataracts—has become ever more common in the field of ophthalmology in recent years. In the process, the biological lens is detached from the capsular bag by way of a minimally invasive intervention and removed. The lens, which has become opacified in the case of a cataract, is then replaced by an artificial lens implant. In the process, this artificial lens implant, or intraocular lens, is inserted into the then empty capsular bag. Knowledge of the correct position of the intraocular lens and the necessary refractive power depend on one another.

Currently utilized IOL calculation formulas have several problems. The currently used calculation formulas for determining refractive aspects of the human eye are practically always based on pre-extracted, biometric variables of OCT images of the patients eye. In this case, the information extracted from the OCT images is restricted to the few predefined, geometric variables that can be extracted. As a result, a large proportion of possibly important information potentially additionally present in the OCT images is lost to the calculation. Moreover, the previously conventional approach requires explicit pre-processing of the images and the extraction of the geometric variables. A media disruption arises at this point, the former drawing out the determination of refractive power, for example in cataract surgery, in refractive corneal surgery and in the determination of spectacle lenses, and potentially containing sources of errors.

Proceeding from the disadvantages of the known methods for approximately determining a correct refractive power for an IOL to be inserted, an underlying object of the concept presented herein is that of specifying a method and a system for improved, integrated and fast IOL refractive power predictions for an intraocular lens, which make do without media disruptions.

SUMMARY

This object is achieved by the method proposed here, the corresponding system and the associated computer program product as per the independent claims. Further embodiments are described by the respective dependent claims.

According to an aspect of the present disclosure, a computer-implemented method for a machine learning-supported determination of refractive power for a measure for correcting the visual perception of a patient is presented. In this case, the method may include a provision of a scan result of an eye, the scan result representing an image of an anatomical structure of the eye.

Furthermore, the method may include a supply of the scan results as input data to a first machine learning system in the form of a convolutional neural network and a use of output values of the first machine learning system as input data for a second machine learning system in the form of a multilayer perceptron. As an additional input value for the second machine learning system, a target refraction value can be used in the process as input information for the second machine learning system.

Finally, the method may include a determination of parameters for the measure for correcting the visual perception of the patient by way of immediate and direct interaction of the first machine learning system and the second machine learning system.

In accordance with another aspect of the present disclosure, a system for determining refractive power for a machine learning-supported determination of refractive power for a measure for correcting the visual perception of a patient is presented. The system for determining refractive power may comprise a reception module for providing a scan result of an eye, the scan result representing an image of an anatomical structure of the eye. Additionally, the system for determining refractive power may comprise a first machine learning system in the form of a convolutional neural network, the latter receiving the scan results as input data.

Furthermore, the system for determining refractive power may comprise a second machine learning system in the form of a multilayer perceptron, which receives output values of the first machine learning system as input data. In this case, a target refraction value may be perceivable by the second machine learning system as an additional input value. A determination module may be adapted to determine parameters for the measure for correcting the visual perception of a patient by way of an immediate and direct interaction of the first machine learning system and the second machine learning system.

Moreover, embodiments may relate to a computer program product able to be accessed from a computer-usable or computer-readable medium that contains program code for use by or in connection with a computer or any other instruction execution system. In the context of this description, a computer-usable or computer-readable medium can be any device that is suitable for storing, communicating, transferring, or transporting the program code.

The computer-implemented method for a machine learning-supported determination of refractive power for a measure for correcting the visual perception of a patient has a plurality of advantages and technical effects which may also apply accordingly to the associated system: the determination of refractive power for an intraocular lens to be inserted—in particular for the cases of cataract surgery, refractive corneal surgery and the determination of spectacle lenses—may be carried out substantially quicker and hence more efficiently because it is possible to completely dispense with the use of calculation formulas for determining refractive aspects of the human eye, in the case of which it is necessary to use influence parameters on the calculation formulas by way of pre-extracted biometric variables from the OCT images of the patients eye. According to the conventional method, media disruptions always arise at this point, which lead to delays and to potential errors in the calculation.

In contrast to the conventional method, the method proposed here (and accordingly also the associated system) operates only with the digital recording of the patients eye—in particular OCT scans of any type—and complements these with value of the desired refractive power for the intraocular lens to be inserted, which may differ from the refractive power that would arise as a standard from the trained machine learning system. It is well known that the trained machine learning system contains a model according to which the refractive power for the intraocular lens to be inserted would be derived from the historical data. However, if a different refractive power—a higher or a lower refractive power—is intentionally desired in the current case, this can be supplied as an additional input parameter to the machine learning system (or a part thereof) of the underlying concept here, and so this desired refractive power finds consideration as an additional constraint when determining the refractive power.

Hence this yields a closed system which facilitates a direct determination of refractive power from the OCT image data. Thus, the OCT image data can be directly supplied to the system proposed here (or to the method) such that a display of the refractive power is possible immediately following the recording of image data. Thus, in contrast to known methods, all information of the OCT recording is used as the image information, as a result of which any loss of information is avoided. A few extracted parameters were always only used to date.

Additionally, this could be followed by an automated selection of the intraocular lens to be inserted from a storage system or a corresponding ordering process in order to further reduce the time required.

Further exemplary embodiments are presented below, which can have validity both in conjunction with the method and in conjunction with the corresponding system.

According to an advantageous exemplary embodiment of the method, a type of the provided scan result can be an A-scan, a B-scan, volume data, en-face scan data and/or dynamic eye data. Thus, staff in clinical routine have more options of generating output data available for the selection of the intraocular lens to be inserted. Depending on the device-specific equipment of the clinic, existing devices can be used or can be electronically linked to the system proposed here for data transfer.

According to a further exemplary embodiment of the method, the scan result may represent a time sequence of a plurality of images of the anatomical structure of the eye, with a recurrent neural network being adapted—i.e., in particular also trained and equipped with an appropriate machine learning model—to derive an adaptability of the eye from the time sequence of the images and with the recurrent neural network being arranged between the first machine learning system and the second machine learning system. A precondition for the use of this additional feature in the proposed method would be that digital recordings of the anatomical structure are available over a period of time that, for example, would be characteristic for the adaptability of the eye. Using this, even better and more individual values would arise for determining the final refractive power for a patient.

According to an advantageous exemplary embodiment of the method, the first machine learning system can use a graph, with the scan result being classified into a graph structure according to the nearest neighbor principle. This graph could also incorporate the training data which typically comprise an annotation that, for example, relates to a final postoperative position of the inserted intraocular lens. Additionally, further metadata may have been appended to the training data. In this way, the first machine learning system would be rendered capable of identifying in the graph structure an image comparable to a newly recorded digital image of the eye using the principle of the shortest distance in order thus to determine the final position (i.e., after a growing-in process which may extend over several weeks). This position would then be part of the data which is directly and immediately transferred from the first machine learning system—directly or indirectly—to the second machine learning system of the concept proposed here such that the second machine learning system can ascertain a direct determination of the required refractive power.

According to a developed exemplary embodiment of the method, additional input data can be used for the second machine learning system during the training. They could be used as further boundary conditions during the training to form the machine learning model in order to represent further constraints and in order thus to accelerate the training or learning process, to make the latter more precise, or to stabilize the learning results. These additional input data would no longer be provided during the operative operation of the method or the system.

Values for these additional input data may relate to the following: The IOL position—in particular the expected final position of the IOL following a growing-in process—could be specified as a typical further parameter. Moreover, it is also possible to use a value of the IOL shift, which denotes a shift perpendicular to the optical axis. The beam path in the respectively chosen model would change depending on the shift value.

Additionally or in a complementary manner, it is also possible to use an IOL tilt value (i.e., a tilt angle of the IOL with respect to the optical axis). In this case too, the beam path would be adapted by the change. The IOL type, in particular the haptic, the shape, etc., would also be conceivable. It may determine the position of the lens by way of the haptic/shape and thus influence the final quality of the operation (insertion of the correct IOL).

According to an extended exemplary embodiment of the method, an output layer of the first machine learning system and an input layer of the second machine learning system can be fully connected. This would mean that each output node of the first machine learning system would be connected to each input node of the second machine learning system. What can be achieved in this way is that all information available in the first machine learning system is also made available to the second machine learning system. Alternatively, it is also conceivable that only selective connections are established.

According to an in turn extended exemplary embodiment of the method, the scan results can be dewarped prior to processing by the first machine learning system. This would have the advantage that distortions caused by an angle of incidence of the measuring light beam not being optimal during the measurement or arising as a result of other parameters of the present biological lens or the cornea (e.g., in the case of astigmatism) being able to be compensated. The procedure required to this end could be carried out to directly by the first machine learning system or a further preceding machine learning system trained precisely for such anomalies could adopt this task. The output values in the form of a modified digital image of the eye would then be transferred to the first machine learning system as input values. This preceding machine learning system could also be fully—or else only partially—connected to the first machine learning system.

According to an in turn extended exemplary embodiment of the method, signals of a backpropagation can be fed back from the output of the second machine learning system to both of the machine learning systems, in particular to the first and the second machine learning system. In this way, the first machine learning system and the second machine learning system would represent an integrated machine learning system, in which the second part, which may be a multilayer perceptron (MLP), can also have a retroactive influence (back propagation) during the learning phase (training phase) on the first neural network, which may be a convolutional neural network (CNN). Consequently, there would be an integrated and matched learning process for a commonly formed learning model of the two machine learning systems. This can also be achieved by virtue of the first machine learning system and the second machine learning system being fully connected, that is to say that all output nodes of the CNN can be connected to all input nodes of the MLP. A corresponding statement would apply if an optional, recurrent neural network is additionally situated between the CNN and the MLP, said recurrent neural network being suitable for additionally also coprocessing dynamic OCT data.

It is pointed out that exemplary embodiments of the disclosure may be described with reference to different implementation categories. Some examples are in particular described with reference to a method, whereas other exemplary embodiments may be described in the context of corresponding apparatuses. Regardless of this, it is possible for a person skilled in the art to identify and to combine possible combinations of the features of the method and also possible combinations of features with the corresponding system from the description above and below—if not specified otherwise—even if these belong to different claim categories.

Aspects already described above and additional aspects of the present disclosure become apparent inter alia from the exemplary embodiments that are described and from the additional further specific refinements described with reference to the figures.

BRIEF DESCRIPTION OF THE DRAWINGS

Preferred exemplary embodiments of the present disclosure are described below by way of example and with reference to the following figures:

FIG. 1 illustrates a flowchart-like representation of an exemplary embodiment of the computer-implemented method for a determination of refractive power for a measure for correcting the visual perception of a patient.

DETAILED DESCRIPTION OF PREFERRED EMBODIMENTS

Figure 2:
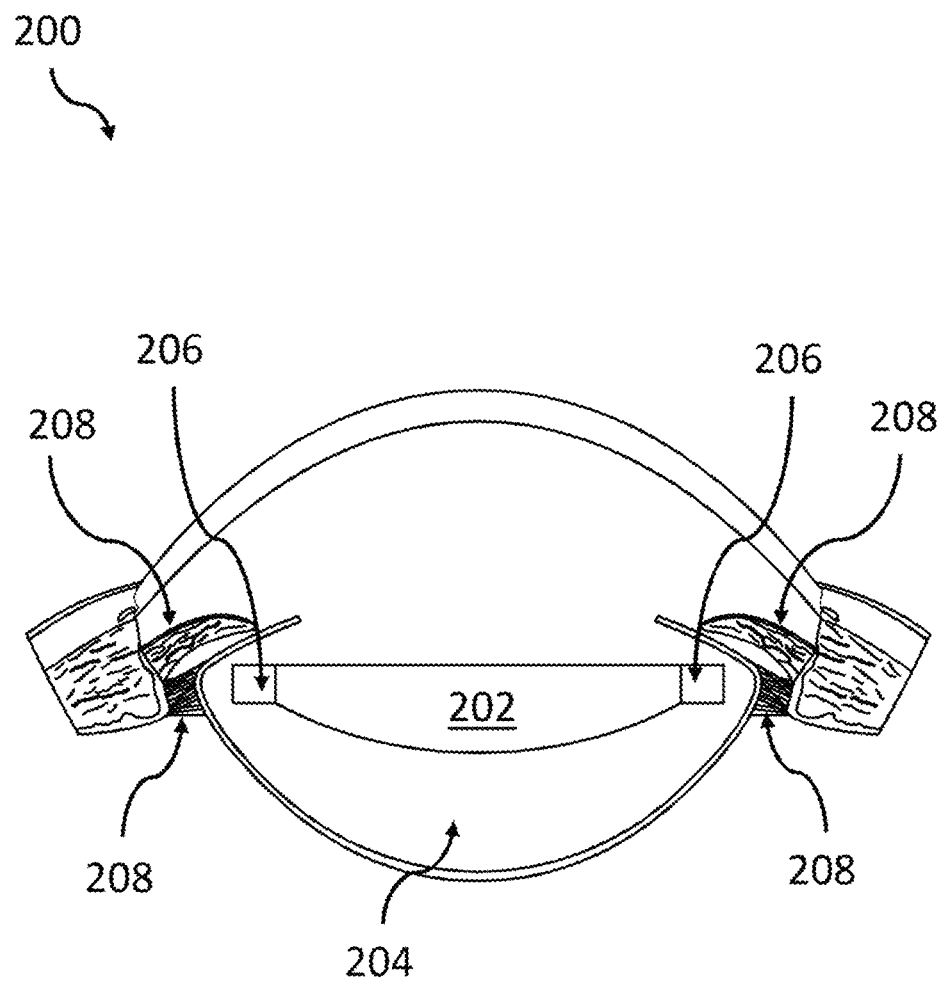
FIG. 2 depicts a cross section of a part of an eye.

In the context of this description, conventions, terms and/or expressions should be understood as follows:

The term "intraocular lens" describes an artificial lens which can be inserted into the eye of a patient operatively to replace the natural, biological lens.

The term "machine learning system" describes a system that is also typically assigned to a method, said system learning from examples. To this end, annotated training data (i.e., training data also containing metadata) is fed to the machine learning system in order to predict output values—output classes in the case of a classification system—that were already set in advance. If the output classes are correctly output with sufficient precision—i.e., an error rate determined in advance—the machine learning system is referred to as trained. Different machine learning systems are known. These include neural networks, convolutional neural networks (CNN) or else recurrent neural networks (RNN).

In principle, the term "machine learning" is a basic term or a basic function from the field of artificial intelligence, wherein statistical methods, for example, are used to give computer systems the ability to "learn". By way of example, certain behavioral patterns within a specific task range are optimized in this case. The methods that are used give trained machine learning systems the ability to analyze data without requiring explicit procedural programming for this purpose. Typically, an NN (neural network) or CNN (convolutional neural network), for example, are examples of systems for machine learning, for forming a network of nodes which act as artificial neurons, and artificial connections between the artificial neurons (so-called links), wherein parameters (e.g., weighting parameters for the links) can be assigned to the artificial links. When training the neural network, the weighting parameter values of the links adjust automatically on the basis of input signals so as to generate a desired result. In the case of supervised learning, the images supplied as input values (training data)—generally (input) data—are supplemented with desired output data (annotations) in order to generate a desired output value (desired class). Considered very generally, mapping of input data onto output data is learned.

The term "neural network" describes a network made of electronically realized nodes with one or more inputs and one or more outputs for carrying out calculation operations. Here, selected nodes are interconnected by means of connections—so-called links or edges. The connections can have certain attributes, for example weighting parameter values, by means of which output values of preceding nodes can be influenced.

Neural networks are typically constructed in a plurality of layers. At least an input layer, a hidden layer, and an output layer are present. In a simple example, image data can be supplied to the input layer and the output layer can have classification results in respect of the image data. However, typical neural networks have a large number of hidden layers. The way in which the nodes are connected by links depends on the type of the respective neural network. In the present example, the prediction value of the neural learning system can be the sought-after refractive power of the intraocular lens.

The term "convolutional neural network" (CNN)—as one example of a classifier/classifier system—describes a class of artificial neural networks that are based on feedforward techniques. They are often used for image analyses using images, or the pixels thereof, as input data. The main components of convolutional neural networks are in this case convolution layers (hence the name) that allow efficient evaluation through parameter sharing. In contrast to the CNN, each pixel of the recorded image would typically be associated with an artificial neuron of the neural network as an input value in a conventional neural network.

The term "parameter value" describes geometric or biometric values, or ophthalmological data of an eye of a patient. Examples of parameter values of an eye are discussed in more detail on the basis of FIG. 2.

The term "scan result" describes digital data, for example on the basis of digital images/recordings, which represent the result of an OCT (optical coherence tomography) examination on an eye of a patient.

The term "optical coherence tomography" (abbreviated OCT) describes a known imaging method of ophthalmology, for obtaining two- and three-dimensional recordings (2-D or 3-D) of scattering materials (e.g., biological tissue) with micrometer resolution. In the process, use is essentially made of a light source, a beam splitter and a sensor—for example in the form of a digital image sensor. In ophthalmology, OCT is used to detect spatial differences in the reflection behavior of individual retinal layers, and morphological structures can be represented with a high resolution.

The term "A-scan" (also referred to as axial depth scan) describes a one-dimensional result of a scan of a patient's eye, which provides information about geometric dimensions and locations of structures within the eye.

The term "B-scan" describes a lateral overlay of a plurality of the aforementioned A-scans, to obtain a section through the eye. Volume views are also generable by combining a plurality of layers of the eye generated thus.

The term "en-face OCT" in this case describes a method for producing transverse sectional images of the eye—in contrast to the longitudinal sectional images using the aforementioned A- or B-scans.

The term "image" or else "digital image"—e.g., from a scan—in this case describes an image representation of, or the result of generating an amount of data in the form of pixel data from, a physically existing article: by way of example, a retina of an eye in this case. More generally, a "digital image" can be understood to be a two-dimensional signal matrix. The individual vectors of the matrix can be adjoined to one another in order thus to generate an input vector for a layer of a CNN. The digital images can also be individual frames of video sequences. Image and digital image can be understood to be synonymous in this case.

The term "recurrent neural networks" denotes neural networks which, in contrast to the feedforward networks, are distinguished by links of neurons (i.e., nodes) of one layer to neurons of the same or a preceding layer. This is the preferred manner of interconnection of neural networks in the brain, in particular in the neocortex. In artificial neural networks, recurrent connections of model neurons are used to discover time-encoded—i.e., dynamic—information in the data. Examples of such recurrent neural networks include the Elman network, the Jordan network, the Hopfield network and the fully connected neural network. They are also suitable for examining a dynamic behavior in recordings of eyes, in particular for taking account of the accommodation behavior of the eye.

The term "multilayer perceptron" (MLP) denotes a certain class of feedforward neural networks. The term MLP is occasionally used ambiguously in order to refer to any artificial neural network. In the basic version, it consists of only one node or artificial neuron with adjustable weights and a threshold for activation. Currently, various combinations of the original model are understood by this term MLP. In the process, a distinction is made between single layer and multilayer perceptrons (MLPs). Perceptron networks convert an input vector into an output vector and therefore represent a simple associative memory. However, a perceptron typically consists of three layers: an input layer, and output layer and a hidden layer of nodes. Occasionally, MLPs are also referred to as "vanilla neural networks", especially if they in fact have only three layers. The activation functions are normally nonlinear. Supervised learning with annotated training data and back propagation is used in the training phase. As a result of its plurality of layers and the nonlinear activation functions, an MLP should be distinguished from a linear perceptron. Hence, it can distinguish data that are not linearly separable.

The term "refractive power of an intraocular lens" describes the index of refraction of the IOL.

A detailed description of the figures is given below. It is understood in this case that all of the details and information in the figures are illustrated schematically. Initially, a block diagram of an exemplary embodiment of the computer-implemented method according to the disclosure for a machine learning-supported determination of refractive power for a measure for correcting the visual perception of a patient is illustrated. Further exemplary embodiments, or exemplary embodiments for the corresponding system, are described below:

FIG. 1 illustrates a flowchart-like representation of an exemplary embodiment of the computer-implemented method 100 according to the disclosure for a machine learning-supported determination of refractive power for a measure for correcting the visual perception of a patient. In this case, the method 100 includes a provision 102 of a scan result of an eye, with the scan result representing at least one image (in particular one or more digital images) of an anatomical structure of the eye. This can be implemented by means of an OCT recording; the scan results can alternatively also be created by means of ultrasound.

The method 100 further includes a supply 104 of the scan results as input data to a first machine learning system in the form of a convolutional neural network and a use 106 of output values of the first machine learning system as input data for a second machine learning system in the form of a multilayer perceptron. As an additional input value for the second machine learning system, a target refraction value—in particular for example also a delta value in relation to a neutral required value—is used as input information for the second machine learning system. Both neural networks can be fully connected, or else only be partially connected, from the output layer of the first machine learning system to the input layer of the second machine learning system.

Additionally, the presented method 100 includes a determination 108 of parameters for the measure for correcting the visual perception of a patient by way of immediate and direct—i.e., in particular, without an explicit additional determination of eye geometry—interaction of the first machine learning system and the second machine learning system. These measures or improvements in particular include those of cataract surgery, surgical interventions as a consequence of astigmatism or else measures for determining a spectacle lens.

FIG. 2 shows a symbolic representation of a cross section of an eye 200. It is possible to identify the inserted intraocular lens 202, which was operatively inserted into the capsular bag 204 following the removal of the natural crystalline lens. Lateral structures 206 on the intraocular lens 202 should ensure that the intraocular lens 202 is anchored or grows in truly stably in the capsular bag 204. However, a precise position of the intraocular lens 202 which sets in after a relatively long growing-in phase of several weeks, for example, could practically not be predicted to date. This is due to the fact that, inter alia, the capsular bag 204 is substantially larger than the inserted intraocular lens 202 as it previously enclosed the entire natural but now removed crystalline lens. These tendons and the muscular tissue 208, which anchor the capsular bag 204 in the eye or in the skull, change after such an operation, as a result of which the size, the shape, and the position of the capsular bag 204, and hence also the position of the inserted intraocular lens 202, also change. Hence there is also a change in the distance between the inserted intraocular lens 202 and the retina situated further back in the eye. However, optimal postoperative results can only be achieved by optimal matching of the refractive power (refractive index) of the inserted intraocular lens 202 and the distance to the retina. Since the refractive power of the inserted intraocular lens 202 is normally not subsequently changeable, a prediction of the position of the inserted intraocular lens 202 is very desirable.

Figure 3:
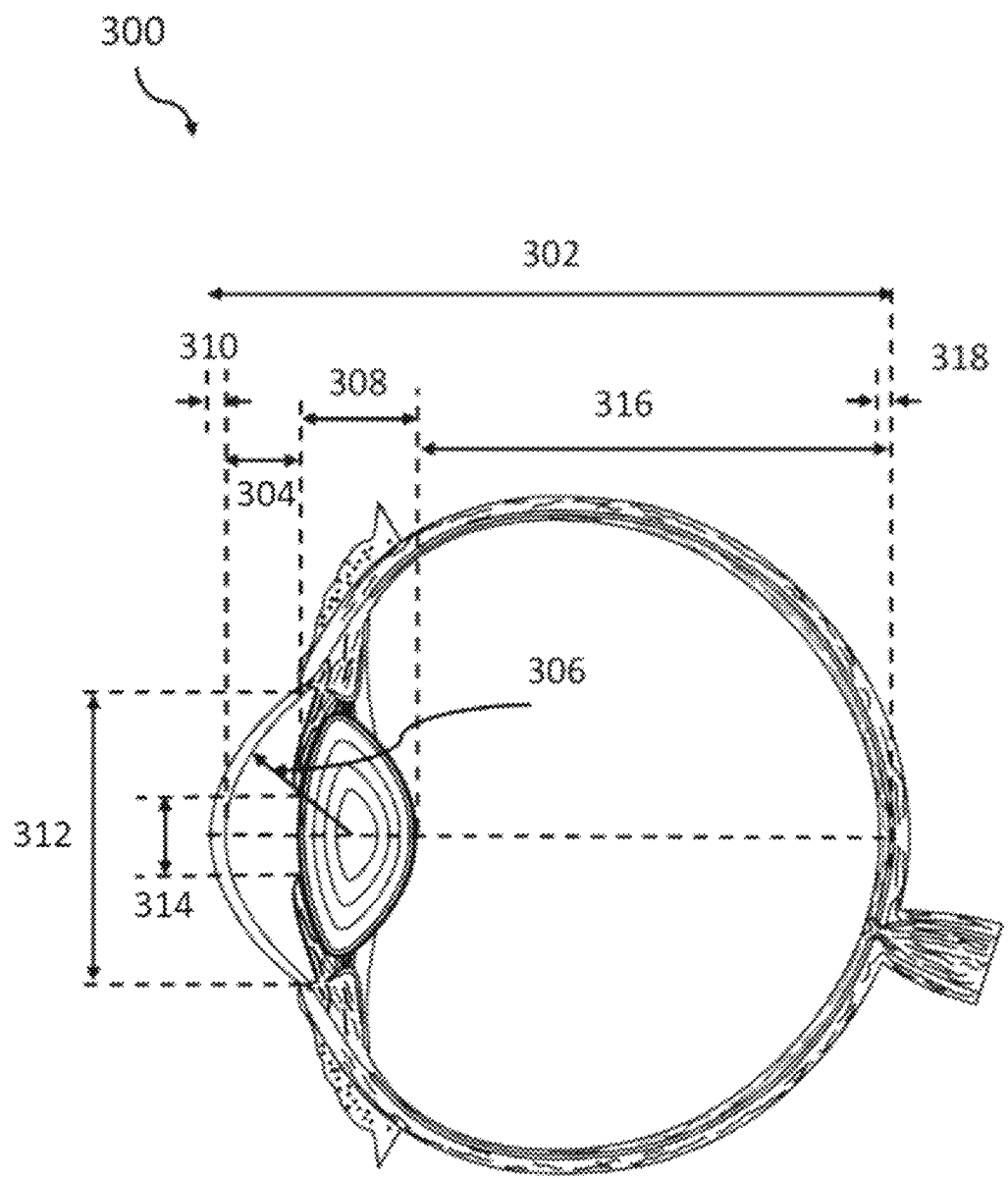
FIG. 3 depicts an eye together with different biometric parameters of the eye.

FIG. 3 depicts an eye 300 with different biometric parameters of the eye. In particular, the following parameters are represented: axial length 302 (AL), anterior chamber depth 304 (ACD), keratometry value 306 (K, radius), refractive power of the lens, lens thickness 308 (LT), central cornea thickness 310 (CCT), white-to-white distance 312 (WTW), pupil size 314 (PS), posterior chamber depth 316 (PCD), retina thickness 318 (RT). At least one of these parameters is contained both in ophthalmological training data and in the ophthalmological data of a patient, which are each contained in the subject matter of the concept presented here.

Figure 4:
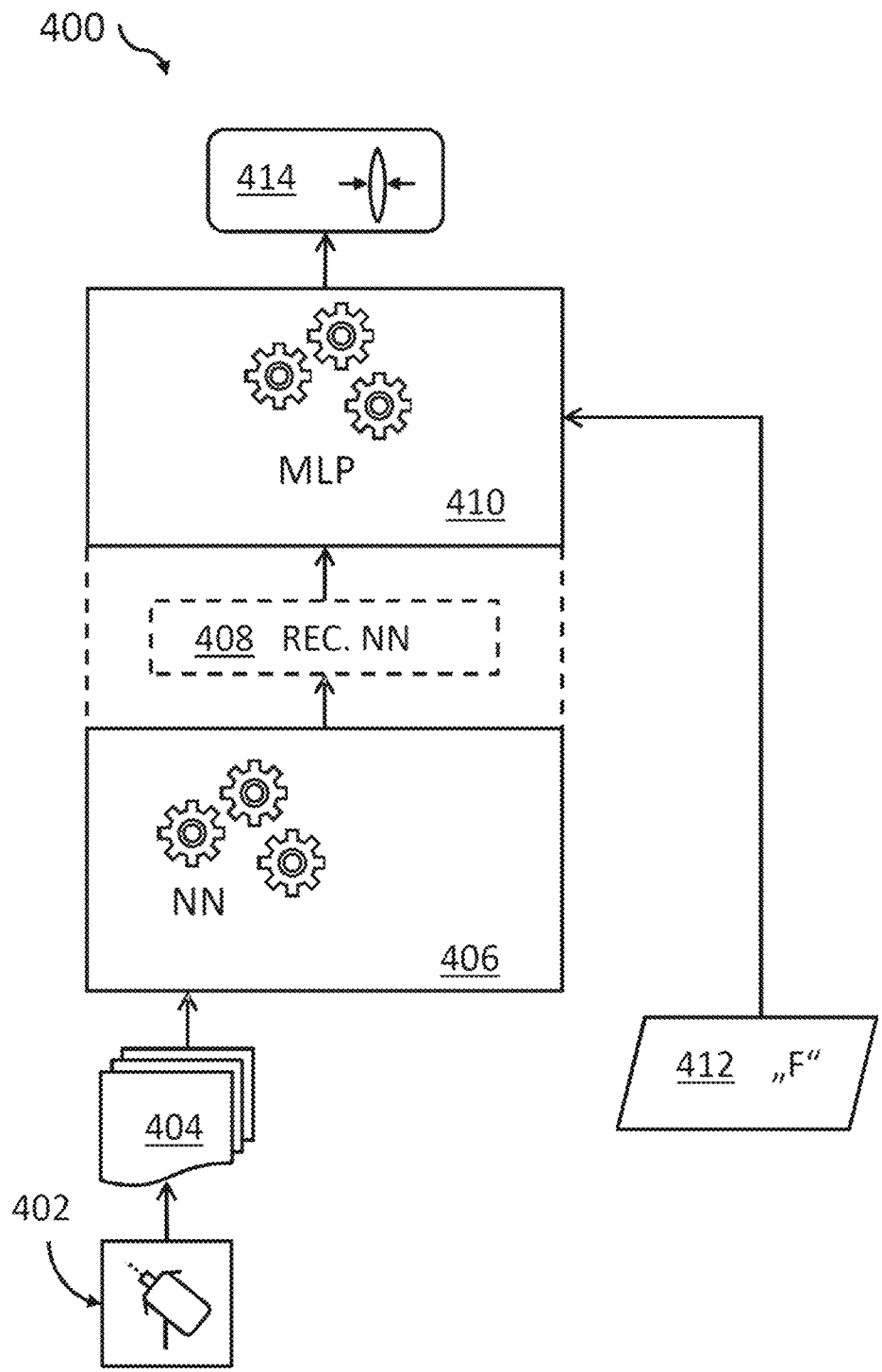
FIG. 4 illustrates a schematic structure of essential functional blocks of the presented method.

FIG. 4 illustrates a schematic structure of essential functional blocks 400 of the presented method. In principle, the OCT data are used directly in the determination of the refractive power and supply the refractive result without further pre-processing. All relevant information can be taken directly from the digital OCT image (or the plurality of images) by way of a machine learning system. Advantageously, the concept according to the disclosure can be used when determining the refractive power of the IOL in cataract surgery, for the refractive calculations in corneal surgery, and in the determination of the correct spectacle lens.

The calculation of the refractive result is implemented in a seamless ("end-to end") machine learning pipeline on the basis of one or more integrated neural network(s). Relevant information can be gathered from the OCT data with the aid of the convolutional neural network (CNN). These are processed further in a multilayer perceptron (MLP) and calculate the refractive result. The refractive target is entered into the MLP as additional input parameter. FIG. 4 represents the application for the calculation of the IOL refractive power during a cataract operation. However, refractive information in respect of the other two applications, corneal surgery and determination of a spectacle lens, could be obtained according to the same concept.

In detail, FIG. 4 shows the recording of a digital image in the form of OCT data 404 (by means of a digital recording device/OCT scanner 402). These are supplied to the CNN 406 as input data. Without considering the optional recurrent neural network 408, the results of the CNN 406 are transmitted directly to the multilayer perceptron 410. In this case, an output layer of the CNN 406 can be directly and fully connected to an input layer of the multilayer perceptron 410. Optionally, only selected connections can be established in this case.

Additionally, the multilayer perceptron 410 contains the desired refractive power 412 as additional input parameter. Its value can be chosen manually. From the input parameters of the CNN 406 present thus and from the desired refractive power 412 the MLP 410 determines the final refractive power 414, which can also be displayed (or further processed in any other way). It is self-evident that both the CNN 406 and the multilayer perceptron 410 each have a learning model, which was trained together with annotated training data for different target refractive powers.

Optionally, a further layer of a machine learning system in the form of a recurrent neural network 408 may be inserted between the CNN 406 and the multilayer perceptron 410. The input nodes of this recurrent neural network 408 would accordingly be fully or partially connected to the output nodes of the CNN 406, and the output nodes of the recurrent neural network 408 would accordingly be fully or partially connected to the input nodes of the multilayer perceptron 410. Consequently, the two neural networks 406 and 410—or neural networks 406, 408 and 410 in the optional embodiment—would be directly and immediately interconnected without there being media disruptions. In this way, as a result of the pipeline-type structure, the final refractive power of the IOL could be determined virtually within one operation proceeding from the OCT image data 404. The recurrent neural network 408 could ensure processing of dynamic OCT image data 404, such that the eye's ability of adaptation could also be taken into account.

Figure 5:
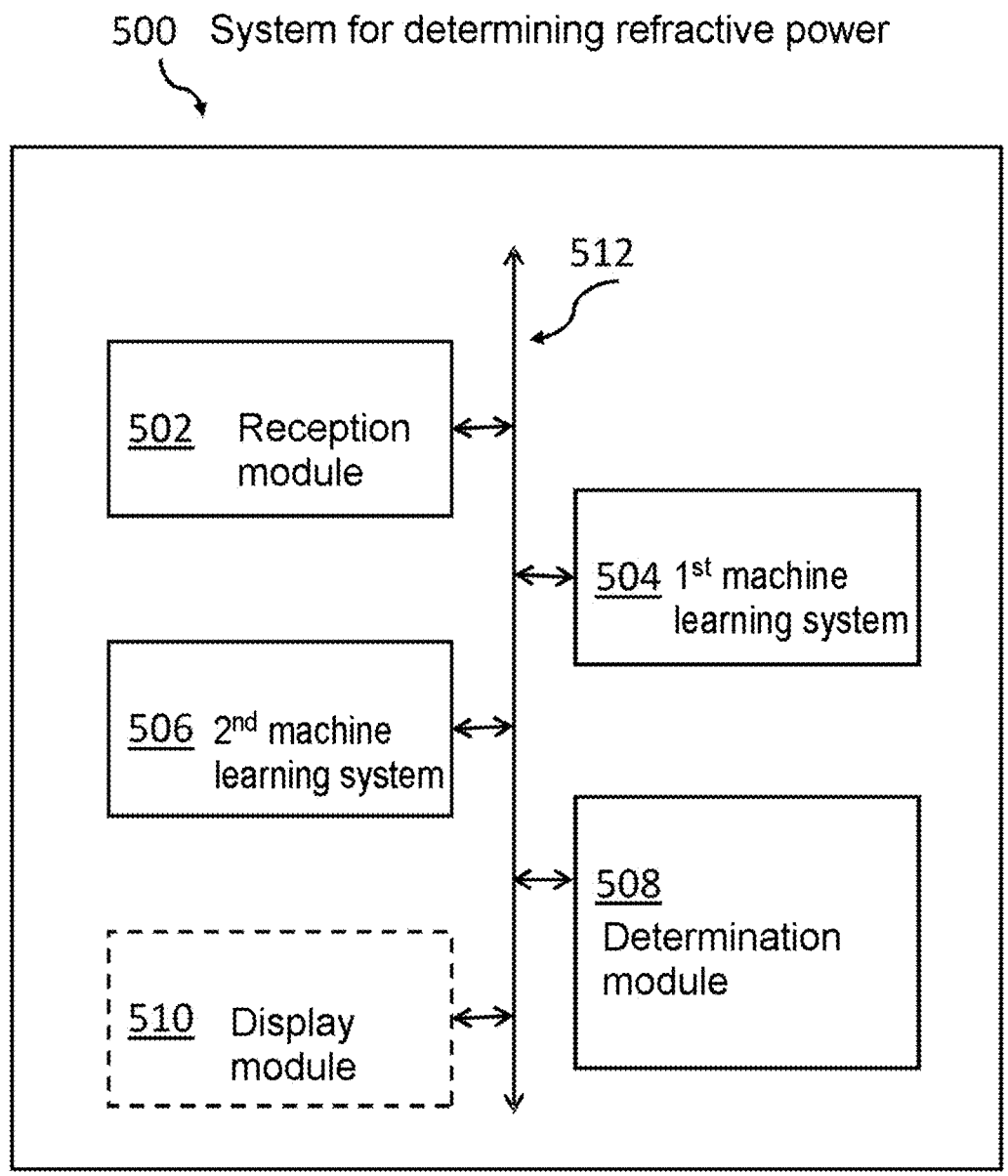
FIG. 5 illustrates a diagram of the system according to the disclosure for determining refractive power for a measure for correcting the visual perception of a patient.

FIG. 5 illustrates—for the sake of completeness—a preferred exemplary embodiment of components of the system 500 for determining refractive power for a machine learning-supported determination of refractive power for a measure for correcting the visual perception of a patient. The measure for correcting the visual perception of a patient may relate to the fields of cataract surgery, refractive corneal surgery or determination of a spectacle lens.

To this end, the system 500 for determining refractive power comprises a reception module 502 for providing a scan result of an eye, the scan result representing a digital image of an anatomical structure of the eye. Furthermore, the system 500 for determining refractive power comprises a first machine learning system 504 in the form of a convolutional neural network, which receives the scan results as input data, and a second machine learning system 506 in the form of a multilayer perceptron, which receives output values of the first machine learning system as input data. In this case, a target refraction value (not illustrated) is received as an additional input value by the second machine learning system 506.

Finally, the system 500 for determining refractive power comprises a determination module 508 configured to determine parameters for the measure for correcting the visual perception of a patient by way of immediate and direct interaction of the first machine learning system and the second machine learning system.

Reference is made to the fact that all modules and units of the system for determining refractive power can be interconnected directly or indirectly via electrical signal lines or a bus system 512 for signal exchange internal to the system for determining refractive power. A display module 510 for displaying or output of the determined refractive power may optionally be present and connected to the bus system.

Figure 6:
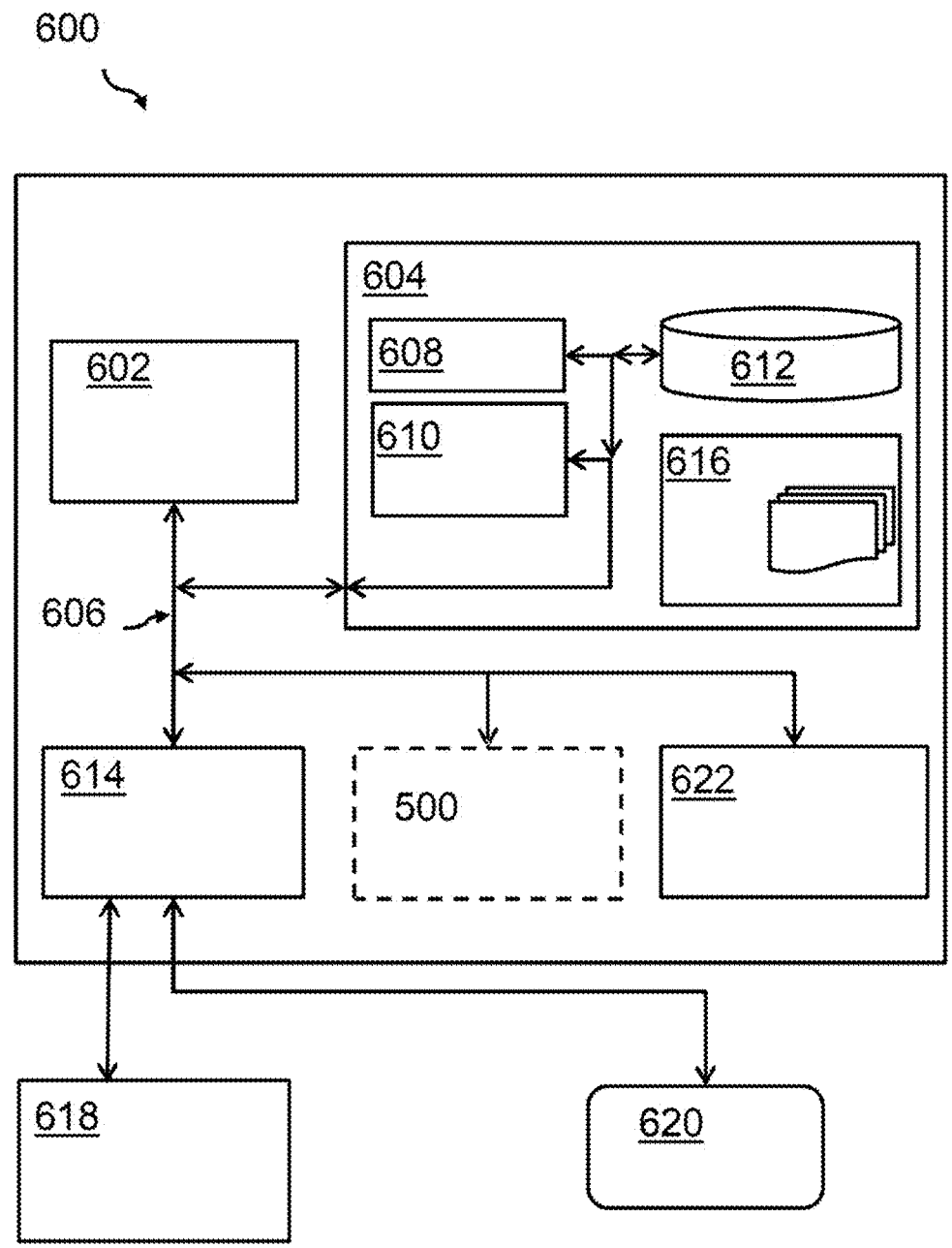
FIG. 6 illustrates a diagram of a computer system which may additionally comprise the system for determining refractive power according to FIG. 5 in full or in part.

FIG. 6 illustrates a block diagram of a computer system that may have at least parts of the system for determining refractive power. Embodiments of the concept proposed here may in principle be used together with virtually any type of computer, regardless of the platform used therein to store and/or execute program codes. FIG. 6 illustrates by way of example a computer system 600 that is suitable for executing program code according to the method proposed here and may also contain the prediction system in full or in part.

The computer system 600 has a plurality of general-purpose functions. The computer system may in this case be a tablet computer, a laptop/notebook computer, another portable or mobile electronic device, a microprocessor system, a microprocessor-based system, a smartphone, a computer system with specially configured special functions or else a constituent part of a microscope system. The computer system 600 may be configured so as to execute computer system-executable instructions—such as for example program modules—that may be executed in order to implement functions of the concepts proposed here. For this purpose, the program modules may comprise routines, programs, objects, components, logic, data structures etc. in order to implement particular tasks or particular abstract data types.

The components of the computer system may have the following: one or more processors or processing units 602, a storage system 604 and a bus system 606 that connects various system components, including the storage system 604, to the processor 602. The computer system 600 typically has a plurality of volatile or non-volatile storage media accessible by the computer system 600. The storage system 604 may store the data and/or instructions (commands) of the storage media in volatile form—such as for example in a RAM (random access memory) 608—in order to be executed by the processor 602. These data and instructions realize one or more functions and/or steps of the concept presented here. Further components of the storage system 604 may be a permanent memory (ROM) 610 and a long-term memory 612 in which the program modules and data (reference sign 616) and also workflows may be stored.

The computer system has a number of dedicated apparatuses (keyboard 618, mouse/pointing device (not illustrated), screen 620, etc.) for communication purposes. These dedicated devices may also be combined in a touch-sensitive display. An I/O controller 614, provided separately, ensures a frictionless exchange of data with external devices. A network adapter 622 is available for communication via a local or global network (LAN, WAN, for example via the Internet). The network adapter may be accessed by other components of the computer system 600 via the bus system 606. It is understood in this case, although it is not illustrated, that other devices may also be connected to the computer system 600.

Moreover, at least parts of the system 500 for determining refractive power can be connected to the bus system 606 for a machine learning-supported determination of refractive power for a measure for correcting the visual perception of a patient (cf. FIG. 5).

The description of the various exemplary embodiments of the present disclosure has been given for the purpose of improved understanding, but does not serve to directly restrict the inventive concept to these exemplary embodiments. A person skilled in the art will himself/herself develop further modifications and variations. The terminology used here has been selected so as to best describe the basic principles of the exemplary embodiments and to make them easily accessible to a person skilled in the art.

The principle proposed here may be embodied both as a system, as a method, combinations thereof and/or as a computer program product. The computer program product may in this case comprise one (or more) computer-readable storage medium/media having computer-readable program instructions in order to cause a processor or a control system to implement various aspects of the present disclosure.

Electronic, magnetic, optical, electromagnetic or infrared media or semiconductor systems are used as forwarding medium; for example SSDs (solid state devices/drives as solid state memory), RAM (random access memory) and/or ROM (read-only memory), EEPROM (electrically erasable ROM) or any combination thereof. Suitable forwarding media also include propagating electromagnetic waves, electromagnetic waves in waveguides or other transmission media (for example light pulses in optical cables) or electrical signals transmitted in wires.

The computer-readable storage medium may be an embodying apparatus that retains or stores instructions for use by an instruction execution device. The computer-readable program instructions that are described here may also be downloaded onto a corresponding computer system, for example as a (smartphone) app from a service provider via a cable-based connection or a mobile radio network.

The computer-readable program instructions for executing operations of the disclosure described here may be machine-dependent or machine-independent instructions, microcode, firmware, status-defining data or any source code or object code that is written for example in C++, Java or the like or in conventional procedural programming languages such as for example the programming language "C" or similar programming languages. The computer-readable program instructions may be executed in full by a computer system. In some exemplary embodiments, there may also be electronic circuits, such as, for example, programmable logic circuits, field-programmable gate arrays (FPGAs) or programmable logic arrays (PLAs), which execute the computer-readable program instructions by using status information of the computer-readable program instructions in order to configure or to individualize the electronic circuits according to aspects of the present disclosure.

The disclosure proposed here is furthermore illustrated with reference to flowcharts and/or block diagrams of methods, apparatuses (systems) and computer program products according to exemplary embodiments of the disclosure. It should be pointed out that practically any block of the flowcharts and/or block diagrams can be embodied as computer-readable program instructions.

The computer-readable program instructions may be made available to a general-purpose computer, a special computer or a data processing system able to be programmed in another way in order to create a machine such that the instructions that are executed by the processor or the computer or other programmable data processing apparatuses generate means for implementing the functions or procedures that are illustrated in the flowchart and/or block diagrams. These computer-readable program instructions may accordingly also be stored on a computer-readable storage medium.

In this sense, any block in the illustrated flowchart or the block diagrams may represent a module, a segment or portions of instructions that represent several executable instructions for implementing the specific logic function. In some exemplary embodiments, the functions represented in the individual blocks can be implemented in a different order—optionally also in parallel.

The illustrated structures, materials, sequences, and equivalents of all of the means and/or steps with associated functions in the claims below are intended to apply all of the structures, materials or sequences as expressed by the claims.

The invention claimed is:

1. A computer-implemented method for a machine learning supported determination of a refractive power for a measure for correcting a visual perception of a patient, the method comprising;
    obtaining a scan result of an eye of the patient, the scan result representing an image of an anatomical structure of the eye;
    obtaining a target refraction value for the corrected visual perception of the patient when the measure is applied to the patient;
    processing, using a first machine learning system, the scan result to generate output values, the first machine learning system comprising a convolutional neural network;
    processing, using a second machine learning system, the output values of the first machine learning system and the target refraction value, the second machine learning system comprising a multilayer perceptron, wherein the first machine learning system and the second machine learning system are fully integrated; and
    determining parameters for the measure for correcting the visual perception of the patient by way of immediate and direct interaction of the first machine learning system and the second machine learning system, the parameters comprising the refractive power for the measure.

2. The method of claim 1, wherein a type of the scan result comprises at least one of an A-scan, an B-scan, volume data, en-face scan data, or dynamic eye data.

3. The method of claim 1, wherein:
    the scan result represents a time sequence of a plurality of images of the anatomical structure of the eye; and
    the method further comprises deriving, using a recurrent neural network, an adaptability of the eye from the time sequence of the images, the recurrent neural network being arranged between the first machine learning system and the second machine learning system.

4. The method of claim 1, wherein:
    the first machine learning system uses a graph; and the scan result is classified into a graph structure according to a nearest neighbor principle.

5. The method of claim 1, wherein additional input data is used for training the second machine learning system.

6. The method of claim 1, wherein an output layer of the first machine learning system and an input layer of the second machine learning system are fully connected.

7. The method of claim 1, wherein the scan result is dewarped prior to processing by the first machine learning system.

8. The method of claim 1, wherein signals of a backpropagation are fed back from an output of the second machine learning system to both of the first machine learning system and the second machine learning system.

9. A system for a machine learning supported determination of a refractive power for a measure for correcting a visual perception of a patient, the system comprising a reception module configured to obtain a scan result of an eye of the patient and a target refraction value for the corrected visual perception of the patient when the measure is applied to the patient, the scan result representing an image of an anatomical structure of the eye;
    a first machine learning system comprising a convolutional neural network configured to process the scan result to generate output values; and
    a second machine learning system comprising a multilayer perceptron, the second machine learning system configured to process the output values of the first machine learning system and the target refraction value, wherein the first machine learning system and the second machine learning system are fully integrated; and
    a determination module configured to determine parameters for the measure for correcting the visual perception of the patient by way of immediate and direct interaction of the first machine learning system and the second machine learning system, the parameters comprising the refractive power for the measure.

10. A non-transitory computer program product for a machine learning supported determination of a refractive power for a measure for correcting a visual perception of a patient, the computer program product storing program instructions that, when executed by one or more computers or control units, cause the one or more computers or control units to carry out the method of claim 1.

* * * * *